United States Patent
Rawdon et al.

(10) Patent No.: US 6,722,610 B1
(45) Date of Patent: Apr. 20, 2004

(54) METHOD, SYSTEM, AND COMPUTER PROGRAM PRODUCT FOR CONTROLLING MANEUVERABLE WHEELS ON A VEHICLE

(75) Inventors: Blaine K. Rawdon, San Pedro, CA (US); Zachary C. Hoisington, Long Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/303,552

(22) Filed: Nov. 25, 2002

(51) Int. Cl.[7] ............................................. B64C 25/00
(52) U.S. Cl. ................................................ 244/103 W
(58) Field of Search ..................... 244/102 R, 103 R, 244/103 W, 183, 184, 194, 195; 701/16, 17

(56) References Cited

U.S. PATENT DOCUMENTS

| | | | | |
|---|---|---|---|---|
| 2,630,285 A | * | 3/1953 | Geisse | 244/103 W |
| 3,070,336 A | * | 12/1962 | Lear, Sr. | 244/103 R |
| 3,285,541 A | * | 11/1966 | Fehring et al. | 244/103 W |
| 3,643,898 A | * | 2/1972 | Whitener et al. | 244/103 R |
| 3,823,899 A | * | 7/1974 | Currey | 244/103 W |
| 4,335,800 A | | 6/1982 | Arato | |
| 5,242,131 A | | 9/1993 | Watts | |
| 5,513,821 A | * | 5/1996 | Ralph | 244/103 W |
| 5,704,568 A | | 1/1998 | Watts | |

OTHER PUBLICATIONS

1 Mammoet 2001, 19 page Brochure featuring articles on Self Propelled Modular Transport (SPMT) including "Two alstom projects" (p. 8); "It's a boat . . . " (p. 10); "Flower power" (p. 11); "First class bridge travel" (p. 12); "Railway bridge installed" (p. 13); "Heimdal riser" and "Wintershall" (p. 14); "Heaviest offshore structure ever moved on wheels" (p. 15); "Submarine on wheels" (p. 16).

* cited by examiner

Primary Examiner—Galen L. Barefoot
(74) Attorney, Agent, or Firm—Alston & Bird LLP

(57) ABSTRACT

A method, system, and computer program product for controlling a plurality of maneuverable wheels on a vehicle is provided. The method, system, and computer program product control a plurality of maneuverable wheels by providing a steering radius selection and a crab angle selection, generally through a steering control interface and a crab control interface. Also, the method, system, and computer program product control a plurality of maneuverable wheels on an aircraft in order to compensate for crosswind when landing the aircraft. This is generally accomplished via input from wind sensors and a navigation system. Additionally, the method, system, and computer program product controls a plurality of maneuverable wheels on an aircraft for compensating for a crosswind during takeoff of an aircraft.

33 Claims, 6 Drawing Sheets

METHOD, SYSTEM, AND COMPUTER PROGRAM PRODUCT FOR CONTROLLING MANEUVERABLE WHEELS ON A VEHICLE

FIELD OF THE INVENTION

The present invention relates to a system, method, and computer program product for controlling maneuverable wheels on a vehicle, and, more particularly, to a method, system, and computer program product for a controlling a plurality of steerable wheels on a vehicle in order to individually steer each maneuverable wheel according to a steering radius and a crab angle.

BACKGROUND OF THE INVENTION

Vehicles require a high degree of ground maneuverability. Large vehicles tend to have limited maneuverability due to many factors. Many of the present steering system designs for such vehicles, however, do not always accommodate some of desired maneuvering situations. For example, aircraft typically taxi to a position at an airport where portable docking equipment is attached for loading and unloading. Some examples of portable docking equipment include passenger jetways, cargo conveyors, lifts, loaders, etc. To date, docking equipment must be portable due the inability of aircraft to precisely maneuver about fixed equipment or structures. The capabilities of docking equipment are limited due to size and weight constraints necessary to maintain portability. Thus, fixed docking equipment that accommodates aircraft has not been designed. If aircraft could precisely maneuver with respect to fixed structures then the potential for more complex docking equipment may be realized. Eliminating the size, weight, and portability requirements permits more complex systems, perhaps linking multiple airplanes, trucks, trains, and so forth. Such a system has the potential for high throughput and extensive automation, both factors in high efficiency. Therefore, for these and other reasons it would be advantageous to improve the ground maneuverability of many vehicles, including aircraft.

Ground maneuverability of many large vehicles is accomplished by a single wheel or set of wheels along the forward portion of the vehicle. Large transport vehicles, in particular, require a plurality of wheels, fore and aft, to effectively support a payload. These vehicles typically have very long wheelbases. Turning radius is increased with wheelbase on vehicles that steer by pairs of wheels, with pairs or multiple pairs of wheels tracking behind, cars and trucks for example. A large turning radius compromises maneuverability of such vehicles in close quarters, thus restricting their capacity to operate in confined spaces.

Large air transports, are also limited in maneuverability, however, this has more to do with typical wheel arrangements. Low wing transports that tend to align the landing gear along a spanwise axis arrange the tires in groups that are displaced fore and aft from the average spanwise axis of the landing gear. A typical grouping is two by two. These gears do not steer. Steering is provided by forward-mounted nosewheels. The ground maneuverability of aircraft with such landing gear is compromised by tire scrubbing on the non-maneuverable landing gears. The assembly of the wheels, tires, and interconnecting structure on landing gear is usually called a "bogey" or "truck". The fore/aft displacement of the parallel wheels produces tire scrubbing. With such bogeys, there is no single intersection of the nosewheel and main gear axes.

A degree of scrubbing results from a fore/aft gear separation and is dependent primarily on the fore-aft dimension. An additional scrubbing factor is the track between the extreme left and right gears. A wide track gear will place the inboard gear close to the turn center point, exacerbating the scrubbing on the inboard gear. There are a few airplanes with six wheel bogies—three pairs of wheels. The large wheelbase of such a bogey reduces maneuverability to unacceptable levels if all wheels are fixed. The typical solution is to steer the rear pair of wheels on the bogey driven by the same steering input provided for the nose gear.

Nose wheel to main gear wheel base, that is the longitudinal distance between the nose gear axle and the main gear axles, also affects maneuverability, albeit to a smaller extent. When the airplane is steered by the nose gear alone, the main gear do not follow the same track as the nose gear. Instead, the main gear tends to track inside the path of the nose gear. This increases the effective width of the gear if the nose gear follows the taxiway centerline. To date, the common solution to this problem is to use only airports that have sufficiently large runways, taxiways, and aprons to allow for large steering maneuvers.

Some very large high-wing transports use main landing gears that are arrayed in a longitudinal direction along the fuselage sides at an average position that is behind the center of gravity. Steering is also provided by a forward-mounted nose wheel. Due to the longitudinal extent of the main gear, large turning diameters and increased tire scrubbing seriously reduce ground maneuverability. Some aircraft solve this problem by allowing the aft main gear struts to castor.

Other high-wing transports, such as the B-52 bomber, have main landing gear that is located well in front of the center of gravity and additional landing gear located well behind the center of gravity to make room for a disposable payload in a bomb bay. The B-52 has four main gear struts, two forward and two aft of the bomb bay. On each strut are two coaxial wheels. The angle of each pair can be controlled. For steering, only the forward pairs are controlled—the aft pair remains fixed. For crosswind landings and takeoffs the angle of all struts are moved in concert so that the axles are parallel. The principal shortcoming is that it is very narrow so that the airplane tends to tip over. The B-52 uses additional small, castering outrigger landing gears near the wing tips to prevent tip over. This limits the B-52 to very wide runways.

There are some ground transport vehicles with a plurality of wheels that can be steered. Most of these are steered only with the forward pair of wheels. This results in substantial tire scrubbing and limits the minimum turning radius. Some large trucks solve the maneuverability problem by introducing articulation between the tractor and the trailer, but articulation is not practical in many vehicles.

One successful attempt to improve steering on large ground transports has been effective on the Tunner 60K Loader, built by Systems & Electronics, Inc., of St. Louis, Mo. The 60K Loader is a 20-wheel cargo handling vehicle with ten pairs of wheels arrayed in two longitudinal columns and five rows. The forward two rows and aft two rows steer. The driver, via a mechanical linkage, provides steering command. If the design were applied to other vehicles, such as aircraft, the 60K loader design has limited maneuverability chiefly because the suspension geometry and proximity of the chassis limit the angle to which the wheels can be turned. The mechanical linkage additionally limits the maximum wheel turning angle. When steering the fore and aft gear the vehicle follows a common track, and the rear wheels do not track inside the front wheels. The 60K loader can pivot only about a point that is collinear with the fixed middle wheels. As such, a chief limitation of the 60K loader design is the inflexible steering geometry. Additionally, the 60K loader does not have any ability to steer to a crab angle. Therefore, when applied to other vehicles, the 60K loader design is limited by the heavy steering linkage, the inability to crab, and the inability to pivot about any point not on the axis of the fixed wheels.

Aircraft face an additional maneuverability problem with respect to crosswinds on takeoffs and landings. Almost all large air transports use one of two techniques for landing in a crosswind. In the first technique the airplane is flown wings-level with the airplane crabbed with respect to the ground track to account for the crosswind component. At the last moment before touchdown, the pilot uses the rudder to yaw the airplane and landing gear so that it is better aligned with the runway axis. This is a challenging maneuver to time and perform, and requires skill on the part of the aircraft pilot. If the airplane touches down at an angle to the runway axis, a rapid correction must be made to avoid running off the runway.

In the second technique, the airplane is flown in a sideslip condition so that the airplane is at all times aligned with the runway axis. To compensate for the sideforce generated by the yaw angle, the pilot must bank the airplane to the opposite direction from the yaw. This technique requires no last-second maneuver to align the aircraft with the ground track and the runway axis, however, the airplane touches down with one wing exceptionally low to the ground and often touches down on just a single main landing gear. This maneuver is the one used by most transport aircraft pilots, however, it is limited by low wing dihedral angles. Aircraft designers have compensated for this technique by designing aircraft with considerably higher wing dihedral angles than might otherwise be used. In particular, this has especially limited the development of ground effect aircraft that strongly favor aircraft with low dihedral angles.

Wing dihedral angle for many transport aircraft is also set to provide wing tip clearance for crosswind takeoffs. Low wing dihedral angles are proscribed due to the possibility of striking a wing tip just as the airplane leaves the ground. This is the result of several factors. In a crosswind takeoff, the airplane tends to roll away from the wind due to a yaw-roll couple influenced by wing dihedral, the fuselage and the vertical tail. This tendency to roll is countered by a preset opposite aileron roll input by the pilot. The exact canceling input is difficult for the pilot to judge before takeoff because of the stabilizing influence of the gear track on the roll attitude. As the airplane rotates and takes off, this stabilizing influence is suddenly eliminated so that the airplane is free to roll. If the pilot has not properly set the aileron deflection, the plane will tend to roll until a correction is made. This correction is complicated by the yaw stability of the airplane. When the airplane is on the takeoff roll in a crosswind, the airplane is yawed with respect to the airstream. As soon as it takes off, the airplane, due to its yaw stability, tends to align itself with flow. This yawing motion quickly changes the influence of the wing dihedral on roll so that the compensating aileron input changes rapidly in the first second or two after takeoff. To summarize, it is difficult for the pilot to judge the correct aileron compensation before takeoff and to respond rapidly with adjustments just after takeoff. An error in compensation or response can result in a wing tip strike. As a result of this problem, aircraft wing dihedral angles are designed to provide the pilot a statistically safe margin.

As presented above, ground maneuverability and crosswind takeoff and landing maneuverability are primary obstacles to the design of larger air transport. Therefore there is a need in the art to enable an extremely large and heavy aircraft to operate from airports designed for smaller, lighter aircraft. There is also a need in the art to permit a reduction in wing dihedral angle in order to enhance the efficiency of wing-in-ground-effect flight. Additionally, with respect to ground vehicles and aircraft, there is a need in the art to provide a high level of ground maneuverability including the ability to turn about a small radius and to follow a curved path with a narrow effective track.

BRIEF SUMMARY OF THE INVENTION

An improved method, system, and computer program product are therefore provided for controlling a plurality of maneuverable wheels on a vehicle in order to increase ground maneuverability and to compensate for crosswind takeoffs and landings. In this regard, the method, system, and computer program product of one aspect of the present invention increase ground maneuverability by providing a steering control interface and a crab control interface. The steering control interface elects a steering radius for the vehicle. The steering radius is measured from a reference point relative to the vehicle to a point on the ground plane. The crab angle of the vehicle is the angular difference between the true heading of the aircraft and the straight ground track of the aircraft. The true heading is the orientation of the longitudinal axis of the aircraft with respect to geometric heading. The steering control interface and crab control interface are generally rotating hand wheels accessible to the pilot of the vehicle. A processor receives the input from both the steering control interface and the crab control interface and determines a steering angle for each of the plurality of maneuverable wheels.

Each wheel is controlled by a steering mechanism responsive to the steering angle and mechanically turns each respective wheel according to its steering angle. The steering angle for each wheel is chosen in order to rotate each wheel concentrically about the same point in order to minimize tire scrubbing. In one embodiment, a computer program product may control the processor in order to determine the steering radius and the crab angle of the vehicle and to calculate a steering angle for each of the plurality of wheels. The steering angle may be calculated based on the position of each wheel relative to the reference point of the vehicle, the steering radius and the crab angle.

An additional embodiment of the method and system for controlling a plurality of maneuverable wheels on a vehicle includes a braking control interface. As such, the braking control interface-also provides input to the processor such that the processor can determine steering angles in order to artificially increase tire scrubbing to slow the vehicle. In this embodiment, the steering angles of each of the plurality of wheels can be determined to increase the efficiency of other braking mechanisms on the vehicle.

Another aspect of the method, system, and computer program product for controlling a plurality of maneuverable wheels provides compensation for crosswinds on aircraft landing. As such, it is desirable to maneuver the aircraft's true heading towards a relative wind, which is not necessarily aligned with the axis of the runway. While the aircraft is in flight, the difference between the true heading and the ground track of the aircraft is called the drift angle. The crosswind causes the difference in the ground track of the aircraft. This drift angle requires compensation corresponding to a necessary crab angle of the aircraft that will be required as the aircraft touches down on the runway. Thus, a crab angle may be computed by determining the difference between the true heading of the aircraft and a ground track of the aircraft, and each of the plurality of maneuverable wheels may be steered to a particular steering angle corresponding to that crab angle. Therefore, the aircraft lands with no sideslip angle while maintaining a ground track corresponding to the runway axis.

Similarly, another aspect of the method, system, and computer program product controls a plurality of maneuverable wheels on an aircraft to compensate for crosswind takeoffs by determining a crab angle. The desired crab angle of the aircraft may be determined by onboard instrumentation, which provides the aircraft airspeed, wind speed and wind direction. The calculated crab angle may be chosen in order to align the true heading of the aircraft into the direction of relative wind while maintaining the ground track of the aircraft corresponding to the runway axis. However, to obtain maximum acceleration of the aircraft prior to achieving takeoff, the crab angle may be maintained at zero and the aircraft only maneuvered to a crab angle corresponding to the relative wind direction just prior to takeoff. Therefore, at a predetermined airspeed just prior to takeoff, each of the plurality of landing gear are used to orient the aircraft to the desired crab angle while maintaining a constant ground track down the runway.

In one advantageous embodiment of the method and system for controlling a plurality of wheels on an aircraft, the wind angle and relative wind speed may be provided by instrumentation commonly found on aircraft such as pitot-static tube airspeed sensors and wind direction sensors. In another aspect of the method and system, the crab angle may be calculated based upon expected remotely sensed wind speed and remotely sensed wind direction determined by sensors located remotely from the aircraft. Such sensors are commonly found at airports and such data is typically provided to the aircraft by radio communications.

Additionally, as aircraft airspeed increases with acceleration toward takeoff, relative wind speed and wind direction correspondingly changes. Therefore, one aspect of the method and system for controlling a plurality of wheels on an aircraft, calculates an estimated aircraft airspeed at takeoff to determine the necessary crab angle at takeoff. As such, the crab angle and steering angle for each of the plurality of maneuverable wheels may be determined in advance. Additionally, this provides for time integration of relative wind direction such that the calculated crab angle may be refined prior to takeoff.

Therefore one aspect of the method, system, and computer program product enables an extremely large and heavy aircraft to operate from airports designed for smaller, lighter aircraft. Also, increased maneuverability may permit precise aircraft maneuvering about fixed structures, and thus allow design of more efficient docking systems. It is also advantageous to achieve increased maneuverability by using approximately ordinary landing gear commercially available to aircraft manufacturers, without resorting to costly new landing gear systems or supplemental maneuvering equipment. Another aspect of the method, system, and computer program product permits a reduction in wing dihedral angle in order to enhance the efficiency of wing-in-ground-effect flight. In one sense, this is achieved by crabbing the landing gear for takeoff and landing so that the need or tendency to roll is greatly reduced. Another aspect of the invention provides a high level of ground maneuverability including the ability to turn about a small radius and to follow a curved path with a narrow effective track. This aspect is generally achieved by effectively controlling the steering angle of a plurality of wheels in order to precisely turn the vehicle about a given point.

BRIEF DESCRIPTION OF THE SEVERAL VIEWS OF THE DRAWINGS

Figure 1:
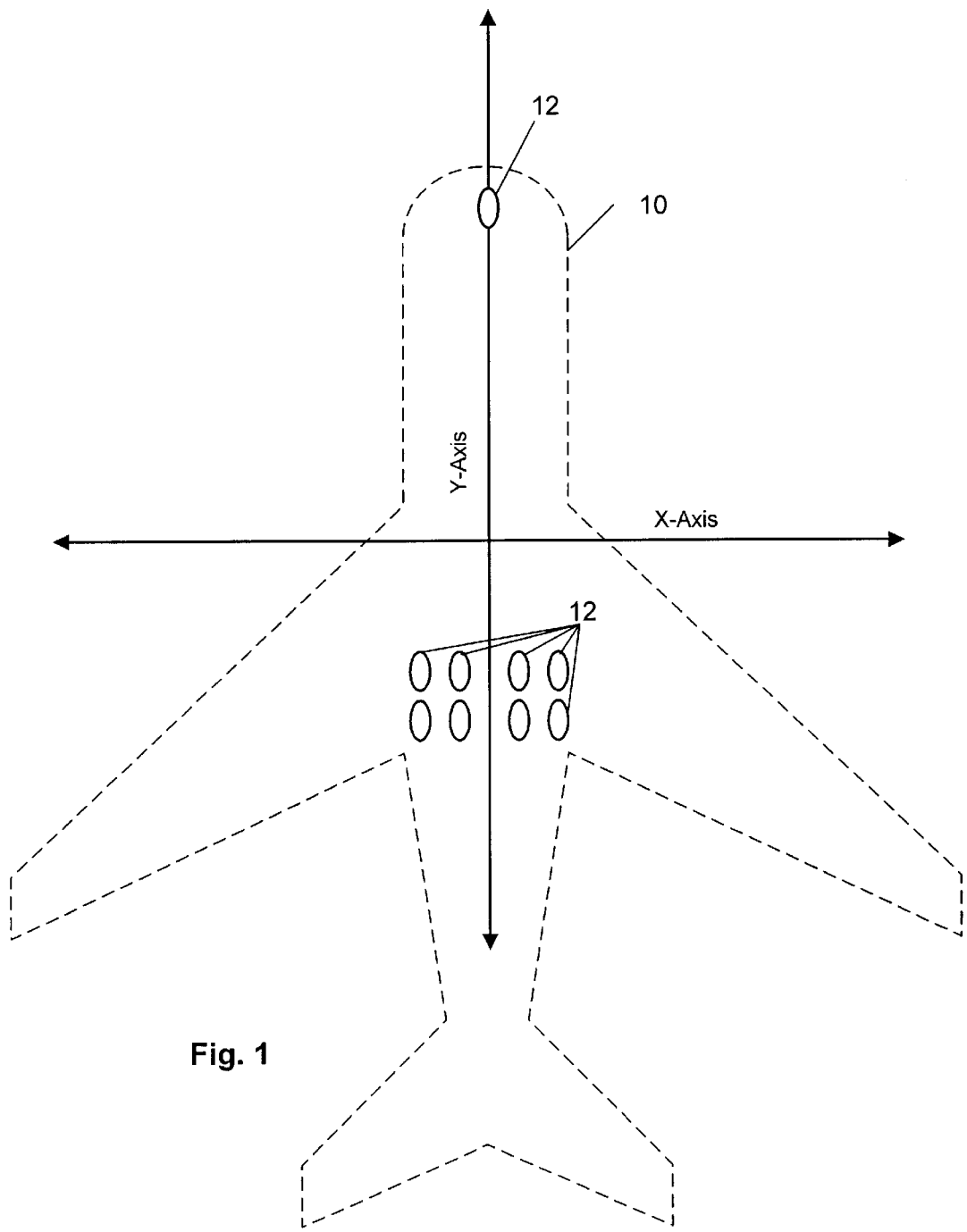
Figure 2:
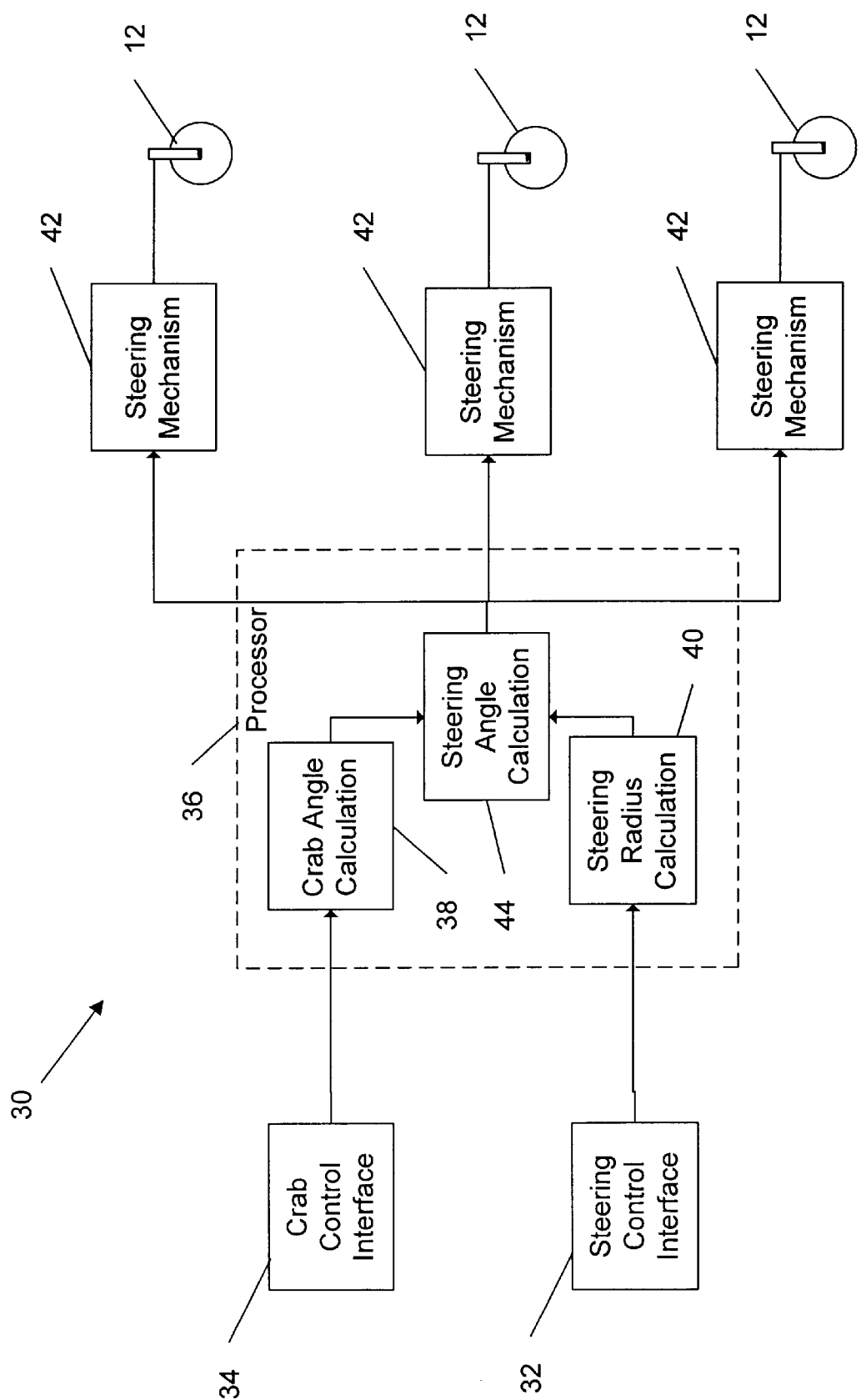
Figure 3:
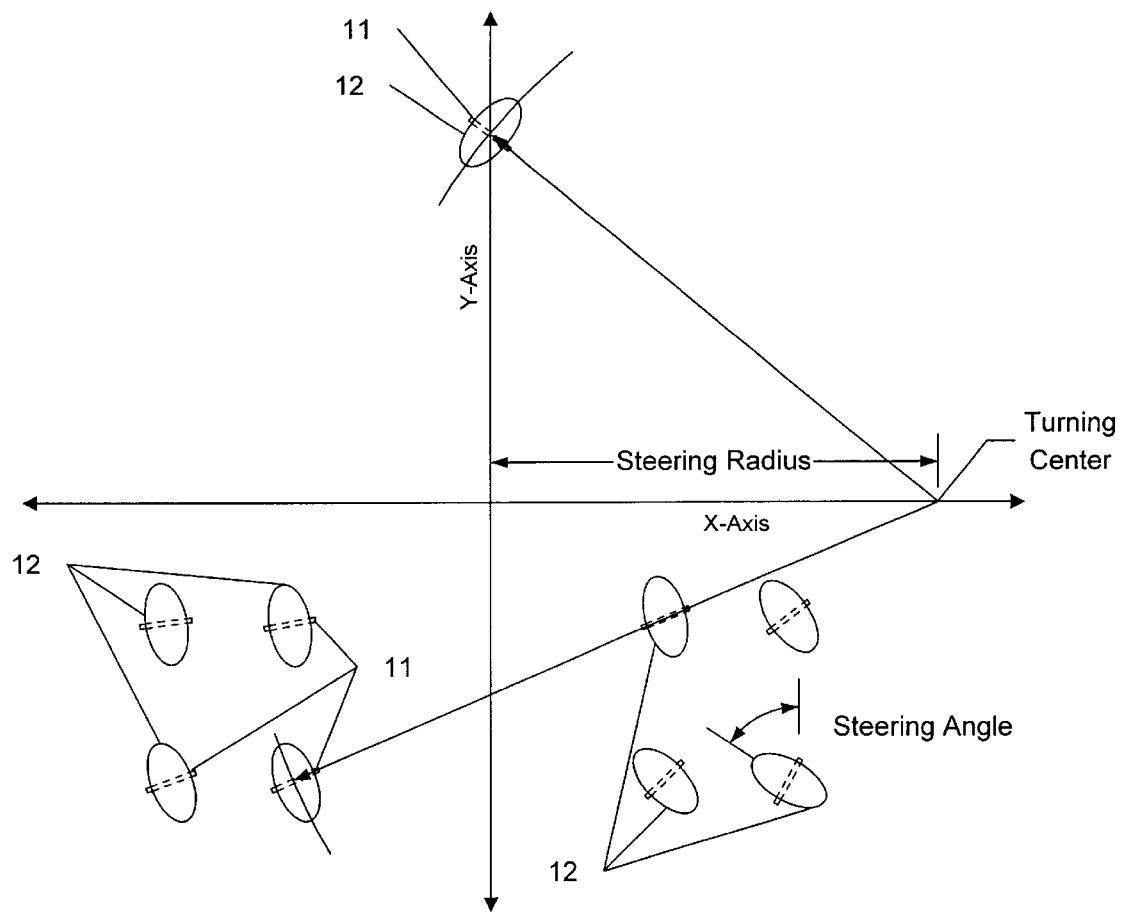
Figure 4:
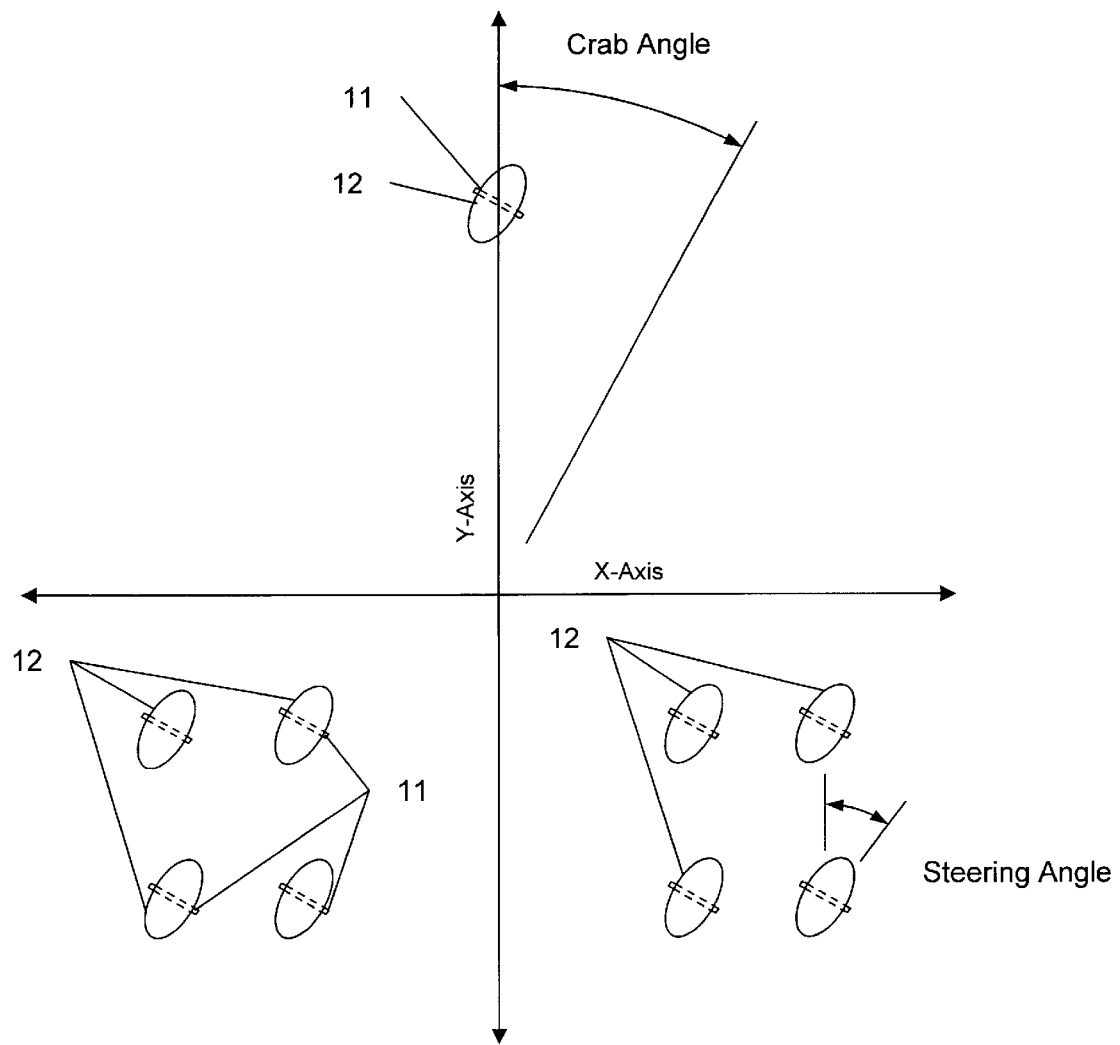
Figure 5:
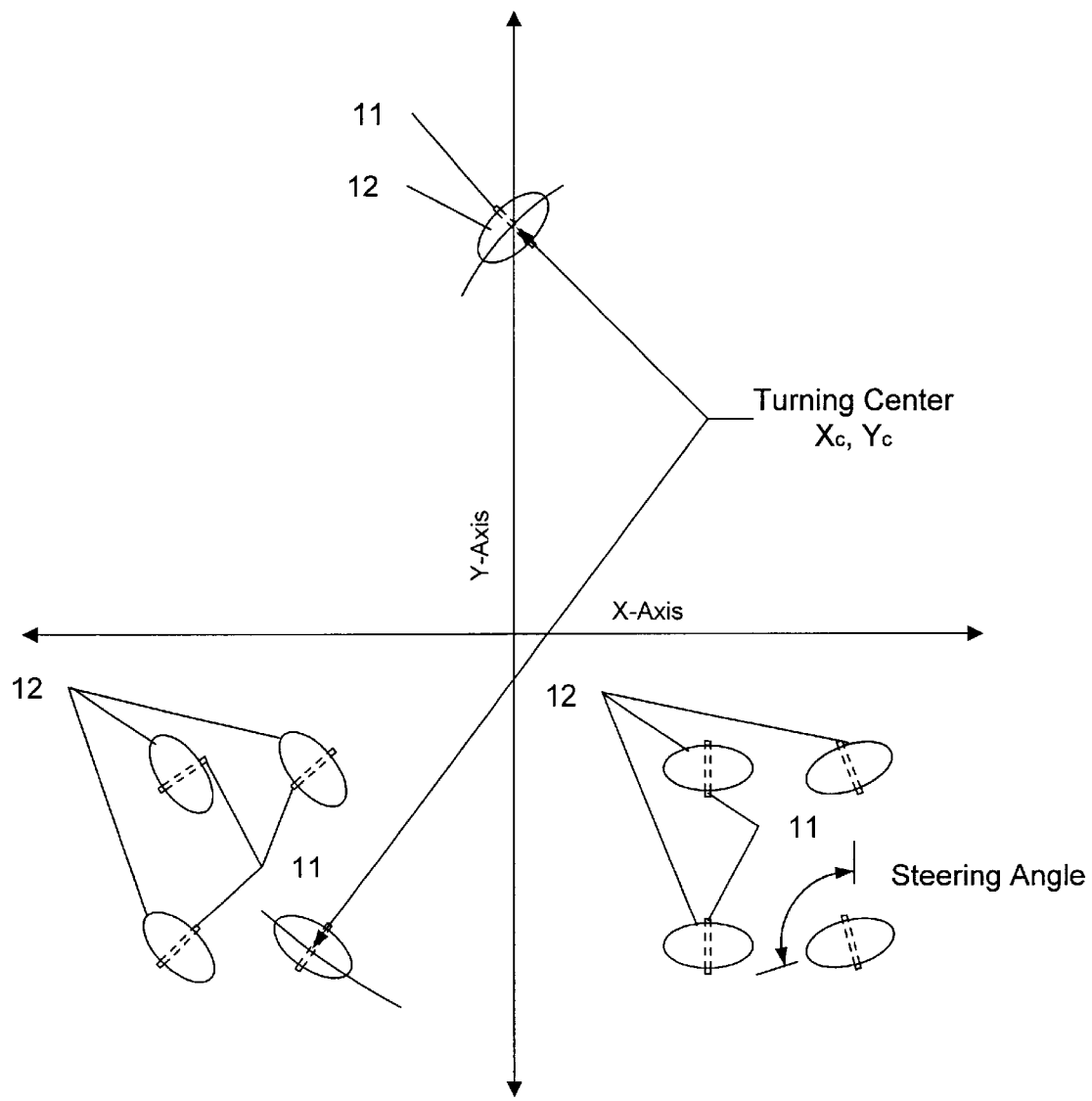
Figure 6:
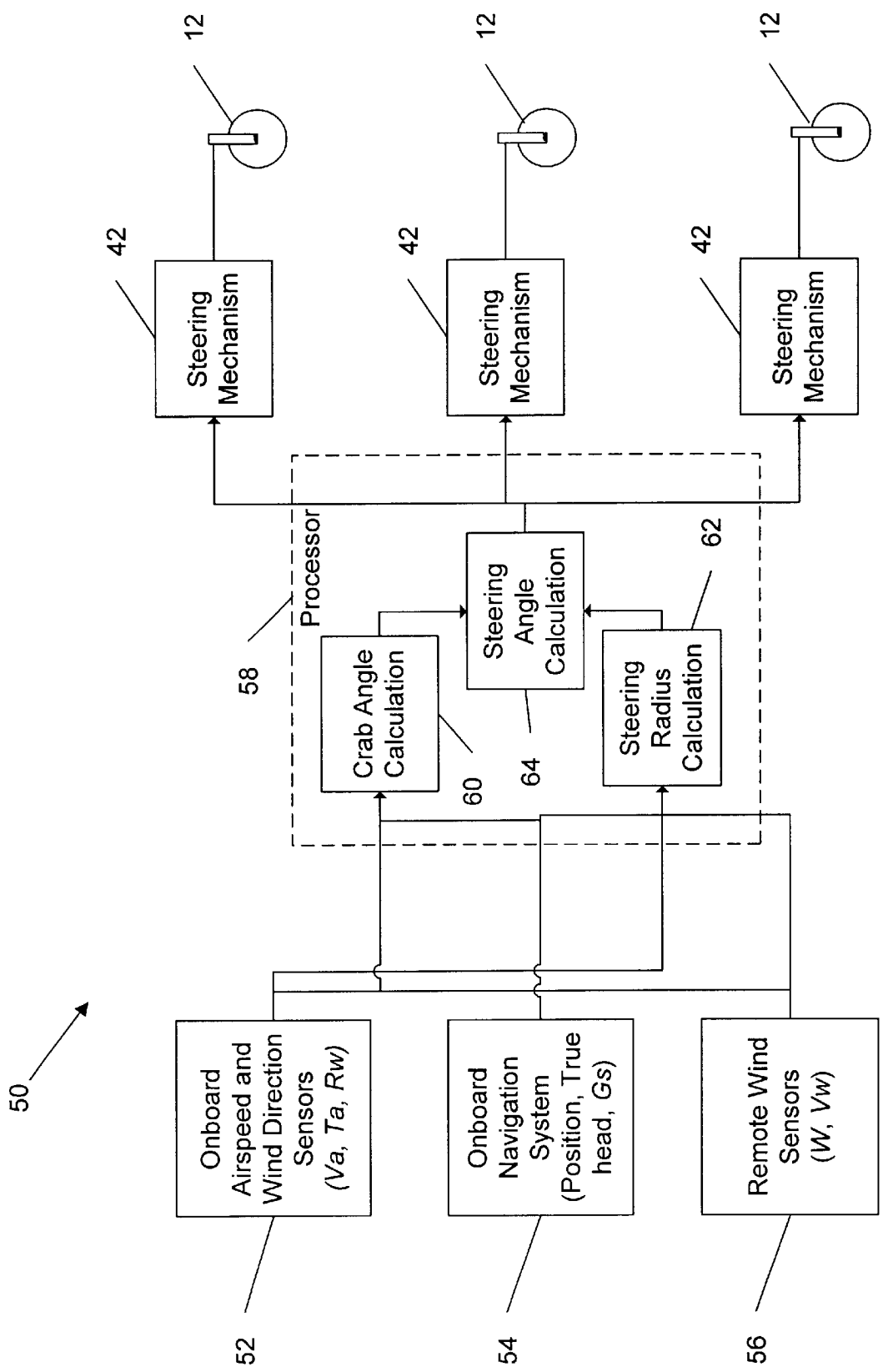

Having thus described the invention in general terms, reference will now be made to the accompanying drawings, which are not necessarily drawn to scale, and wherein:

FIG. 1 is a cut-away plan view of a plurality of maneuverable wheels on an aircraft according to one embodiment of the present invention;

FIG. 2 is a block diagram illustrating the operations performed by the method, system, and computer program product according to one embodiment of the present invention;

FIG. 3 is a plan view illustrating the positioning of a plurality of maneuverable wheels according to one embodiment of the present invention;

FIG. 4 is a plan view illustrating the positioning of a plurality of maneuverable wheels according to another embodiment of the present invention;

FIG. 5 is a plan view illustrating the positioning of a plurality of maneuverable wheels according to a further embodiment of the present invention; and FIG. 6 is a block diagram illustrating the operations performed by the method, system, and computer program product according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A method, system, and computer program product are provided for controlling a plurality of maneuverable wheels on a vehicle. As known to those skilled in the art, vehicles have a wide variety of steering mechanisms depending on the type and model of the vehicle. Aircraft, in particular, typically incorporate landing gear steering struts on the nosewheel and, in some instances, other landing gear. Referring now to FIG. 1 and for purposes of discussion, the method, system, and computer program product of the present invention are described in conjunction with an aircraft 10 that incorporates landing gear steering struts on each of a plurality of wheels 12, which provides an exemplary scheme to implement one advantageous embodiment. However, the method, system, and computer program product for controlling a plurality of maneuverable wheels on a vehicle can be employed in conjunction with other ground vehicles and wheel steering systems without departing from the spirit or scope of the present invention.

Referring now to FIG. 2 and with continued reference to FIG. 1, the system 30 for controlling a plurality of maneuverable wheels 12 on an aircraft 10 also includes a steering control interface 32 for selecting a steering radius and a crab control interface 34 for selecting a crab angle. The steering radius is the radius of the arc about which the aircraft turns. The crab angle is the angular difference between the true heading of the aircraft 10 and the straight ground track of the aircraft 10. True heading is the orientation of the longitudinal axis of the aircraft, and is typically provided in terms of geometric heading or earth reference angular headings. The straight ground track is the tangential line to the arc about which the aircraft turns. Each interface communicates with a processor 36 for performing calculations associated with the method, system, and computer program product for controlling the plurality of wheels 12. The processor performs several calculations, including a crab angle calculation 38, a steering radius calculation 40, and a steering angle calculation 44 for each of the plurality of wheels 12. The steering angle is the angle to which a wheel is turned with respect to the longitudinal axis of the aircraft. Each calculation is discussed in more detail below. As also described hereinafter, the control method is automated and is generally implemented by a computer processor 36, such as a flight control computer or the like. As such, the control method is typically embodied in a computer program product which directs the processor 36 to issue appropriate commands to the steering control mechanisms 42 in order to maneuver each wheel 12 to the desired steering angle. The steering radius, crab angle, steering angles, ground track, and true heading may be referenced to coordinate axes, demonstrated by the X-axis and Y-axis corresponding to the beam axis and longitudinal axis of the aircraft, respectively. Additionally, each of the plurality of wheels is referenced from the intersection of the X-axis and Y-axis, X=0 and Y=0, for purposes of the following discussion.

Referring now to FIG. 3 and with continued reference to FIG. 1, one advantageous embodiment of the method, system, and computer program product determines a steering radius for an aircraft 10 with a plurality of maneuverable wheels 12. In this embodiment, the steering radius is defined between the reference point relative to the aircraft 10 and the point on the ground plane about which to turn the aircraft. The reference point relative to the aircraft may advantageously be chosen corresponding to a center point of the aircraft 10 or a center point of the wheelbase for smoothest turning response. The plurality of maneuverable wheels 12 and corresponding wheel axles 11 on the aircraft 10 are shown in relation to the reference point. In this example the steering radius is illustrated with zero crab angle and extending outwardly along the X-axis to the starboard side of the aircraft 10. As such, the aircraft 10 will make a right turn about the radius. For each of the plurality of maneuverable wheels 12 a steering angle is chosen in order to ensure that each wheel turns concentrically about the same point on the ground plane, the turning center. Accordingly, each wheel axle 11 will align radially with the turning center. Each wheel 12 will correspondingly have a unique steering angle based upon its relative position to the turning point. For zero crab angle, the steering angle may be determined as follows:

$$S = \arctan\left[\frac{Y}{X-R}\right]$$

where S is the steering angle, R is the chosen steering radius, X and Y are the coordinate position of the corresponding wheel with respect to the reference point. As such, a positive turning angle corresponds to a right steering angle and a negative turning angle corresponds to a left steering angle. Of course when the aircraft 10 must travel without turning, the steering radius is infinity. For purposes of calculation by the method, system, and computer program product for controlling a plurality of wheels 12 on a vehicle, an arbitrarily large turning radius may be selected when traveling in a straight path, for example $10^7$ inches.

In one advantageous embodiment, the crab angle and the steering radius are each controlled by a manual interfaces 32, 34. In most conventional vehicles, the steering control interface 32 is typically a steering wheel. In keeping with convention, one embodiment includes such a steering radius control wheel for controlling the steering radius. The steering radius control wheel operates in the same fashion as a conventional steering wheel, when centered the steering radius is infinity and turns to reduce steering radius corresponding to angular change of the steering wheel. One advantageous method to determine the steering radius from a steering wheel input is:

$$R = \frac{S_c}{\tan\left[90\frac{S_i}{S_f}\right]}$$

where R is the steering radius, $S_i$ is the angular position of the wheel with respect to a zero degree reference, $S_f$ is a full scale mechanical limit of the steering wheel, and $S_c$ is a scale constant selected by the aircraft designer in order to adjust the responsiveness of the steering input. Of course, at zero degrees on the steering wheel, $S_i$ is zero and corresponds to a desired radius, R, equal to infinity. The equation however, is undefined at steering input $S_i=0$. Therefore, at or within a margin about $S_i=0$ the radius is substituted with an arbitrarily large value such as $10^7$ inches as described above and the solution is disregarded. As the steering wheel is turned from the neutral position to the left, the steering radius continuously decreases from the arbitrarily large number. At maximum mechanical deflection, the steering radius reaches zero and the vehicle pivots about the reference point. This particular formula is well suited to provide smoothest steering response, however, many variations and steering control formulae which achieve the same effect will become apparent to those skilled in the art and may be substituted accordingly.

Another embodiment of the steering control interface 32 includes at least one steering pedal. Pedals are commonly used on aircraft to control rudder position and nose gear angle and thus steering radius. Typically, two pedals are provided, a right pedal for depressing and steering the vehicle to the right, and a left pedal for depressing and steering the vehicle to the left. In one advantageous embodiment, the steering pedals are combined with the steering wheel control. As such, the scale of the pedal influence is considerably less than that of the steering wheel and may provide a fine adjustment of steering radius.

In one advantageous embodiment, the system, method, and computer program product for controlling a plurality of wheels 12 include a crab control interface 34. FIG. 4 illustrates the steering angle of each wheel 12 and corresponding wheel axle 11 for a desired crab angle of the aircraft 10 with an infinite steering radius. As such, the steering angle is equivalent to the crab angle, but only when the steering radius is infinite or at least a very large approximation as discussed above. In one particular embodiment, the crab control interface 34 is a crab control wheel, similar to the steering control wheel. The crab control wheel provides a linearly proportionate method to control crab angle corresponding to the angular change of the crab control wheel. As such, the crab input is defined as follows:

$$C = \left(\frac{c_i}{c_f}\right) c_m$$

where C is the crab angle, $c_i$ is the angular position of the crab control wheel, $c_f$ is the full scale mechanical limit of the crab control wheel, and $c_m$ is the maximum crab angle set by the vehicle designer. In one advantageous embodiment, rotation of the crab control wheel to the right results in crabbing the aircraft to the left. Therefore, rotation of the wheel to the right results in a crab to the left and movement of the vehicle to the right, thus maintaining the intuitive steering convention, a right turn of the wheel correspond to right motion of aircraft.

For a selected crab angle and a selected steering radius, the steering angle is calculated for each maneuverable wheel 12. Again, it is advantageous to steer each wheel 12 such that it turns concentrically about a single point. Therefore, the steering angle is calculated as follows:

$$S = \arctan\left[\frac{Y - R\sin C}{X - R\cos C}\right]$$

where S is the steering angle, C is the crab angle, R is the steering radius, and X and Y are the coordinate position of the particular wheel with respect to the reference point. Referring now to FIG. 5, each of the plurality of wheels 12 is therefore steered about a single point represented by $X_c$, $Y_c$, the turning center. Accordingly, each wheel axles 11 is aligned radially with the turning center. This turning center may be determined by the following equations:

$X_c = R \cos C$ $X_c = -R \sin C$

Therefore, as the crab control steering wheel and the steering radius wheel are combined, the system, method, and computer program product of the present invention may be adjusted to turn the vehicle about any point on the ground plane.

Many vehicles are limited by a large beamwidth, especially aircraft which are limited by wingspan. For these vehicles, the crab angle and steering radius functions provide a unique advantage of providing large enough crab angles to effectively reduce the beam width. For example, large air transports are often prohibited from taxiing and parking in smaller airport taxiways, aprons, and hangars. Crabbing the aircraft to a large angle reduces the effective span of the aircraft perpendicular to the direction of travel. Additionally, as the crab control interface 34 is independent of the steering control interface 32, extreme crab angles may be selected, and intuitive steering relative to the direction of forward motion is maintained.

As one skilled in the art can recognize from the foregoing, the system, method, and computer program product for controlling a plurality of maneuverable wheels 12 will minimize tire scrub, thus improving the turning efficiency of the vehicle. Tire scrub is the added frictional effect on the tires from turning. Most vehicles do not control steering angles of each of the plurality of wheels and thus promote tire scrub, because tire scrub is increased as the steering path of each wheel is not concentric with other wheels on the vehicle. As the tire scrub increases braking action and the resultant lost energy is converted to heat, the turning efficiency of the vehicle is compromised. The system, method, and computer program product of the present invention calculate a steering angle for each maneuverable wheel 12 according to its relationship to the reference point such that each wheel 12 turns concentrically around a single point in the ground plane. As such, tire scrub is reduced and maneuverability is improved.

Further refinement of the steering angle and crab angle algorithms or similar algorithms is expected and will be recognized by one of ordinary skill in the art when applied to other vehicle and tire designs. Indeed, various bogey, truck, wheel, and tire designs may require modification of these algorithms in order to most effectively limit tire scrub. For example, a side load applied to a tire may distort the tire such that the direction of motion is no longer aligned with the plane of the wheel. The difference in angle between the plane of the wheel and direction of motion is called the slip angle. The slip angle varies as a function of the applied side load. The steering and crab angle algorithms may include modifications or additional algorithms that compensate for the slip angle due to increased side load. However, the relationship between slip angle and side load will vary according to design parameters of each individual tire. Accordingly, these and other possible modifications will become apparent to one skilled in the art as the method, system, and computer program product are applied to a variety of vehicles.

If desired, the system, method, and computer program product for controlling a plurality of maneuverable wheels 12 may be used to advantageously increase tire scrub and thus braking effect. As all of the maneuverable wheels 12 may be individually steered to a respective steering angle, the steering angles may also be calculated to create non-concentric steering angles. As the wheels 12 are steered in conflicting directions, each wheel rotates about a different point increasing tire scrub. As the friction increases, braking action is artificially introduced. Varying degrees of conflicting steering angles may be determined empirically for varying degrees of braking at different vehicle speeds. The steering angles for each wheel are coordinated in order to maintain crab angle and steering radius of the vehicle. Of course, many less complex braking systems are available and well known by those skilled in the art. However, many high speed braking applications, such as aircraft landing sequence, require a high degree of braking thereby pushing braking systems to performance limits. Therefore, it is advantageous to supplement such braking systems with a method of steering each of several wheels 12 to non-concentric angles in order to improve the efficiency of the other braking systems.

One embodiment of a braking system may control each of the plurality of wheels 12 according to the following:

$$S = \arctan\left[\frac{Y - R\sin C}{X - R\cos C}\right] \pm \left[\frac{b_i}{b_f}\right] b_m$$

where S is the steering angle, C is the crab angle, R is the steering radius, X and Y are the coordinate position of the particular wheel with respect to the reference point. The braking command is provided by $b_i$, a braking input command that may be invoked by a dedicated wheel brake control, with either manual input or automatic input. Two constants are a full-scale braking command, $b_f$, and, a gain constant, $b_m$, chosen by the designer that determines sensitivity and power of braking effect.

The choice of positive or negative braking correction to the steering angle is selected according to wheel 12 location, whether on the right side or left side of the vehicle. In this case, the wheels 12 on each side of the vehicle are accorded a steering angle such that they are "toed in", or turned inwardly such that the wheels 12 on the right side of the airplane turn to the left, and those on the left side turn to the right.

In an aircraft, this arrangement may also provide for advantageous resistance to crosswind loads. For example, a wind load from the left may tend to load the tires on the right side of the aircraft. When under toe-in braking, such a vehicle would tend to track toward the left, offsetting the wind load. Of course, the system will also have to take into account other effects of wind load, and then one skilled in the art will recognize whether such embodiments are advantageous as applied to a particular vehicle design.

An alternate embodiment can be applied to vehicles with wheels arranged in relatively symmetrical longitudinal columns and lateral rows. In this embodiment, alternating rows turn inwardly and outwardly. For example, the first row "toes in" as described above. The second row "toes out". The third row "toes in", and so forth. The amount of steering of each wheel may be controlled according to the above equation, or other steering control techniques. This embodiment provides an approximately neutral steering response independent of vehicle attitude (rolling, pitching) and the uneven wheel loadings that result.

According to another embodiment, the braking control input, $b_i$, may alternatively be provided by a control system which provides braking instruction to additional braking systems, rather than a dedicated wheel brake control. In an aircraft, for example, the aircraft rudder pedal and toe brake typically provides input to a control system, such as flight control computer or the like, for controlling other braking systems. As such, the control system may be configured to select the braking control input and/or the brake gain in order to achieve maximum braking efficiency in conjunction with the additional braking system.

Further refinement of the algorithm or similar algorithms is expected and will be recognized by one of ordinary skill in the art when applied to other vehicle designs and when used in conjunction with other braking systems. For instance, many braking systems tend to load the forward wheels more than the aft. In this case, it would be advantageous to select the braking gain, $b_m$, according to the longitudinal position on the vehicle so that the forward wheels tend to provide more brake force relative to the other wheels.

Another aspect of the system, method, and computer program product for controlling a plurality of wheels 12 includes controlling a plurality of maneuverable wheels 12 on an aircraft 10 to compensate for crosswinds during landing and takeoff. Referring now to FIG. 6, the system 30 for controlling a plurality of maneuverable wheels 12 on an aircraft 10 also includes onboard airspeed and wind sensors 52, which are normally found aboard aircraft, such as pitot-tube pressure sensors, static pressure sensors, and combinations thereof. Remote wind sensors 56 are also provided in one embodiment. These may comprise sensors commonly found at weather stations and airport facilities. These sensors normally communicate weather data, including wind direction and wind speed, to aircraft via radio communication, either by data transmission or by voice for manual data entry. An onboard navigation system is also provided and supplies position data, true heading data, and groundspeed data. Each of the sensors and the navigation system communicates with a processor 58 for performing calculations associated with the method, system, and computer program product for controlling the plurality of wheels 12. As in the case of remote wind sensors 56, the communication may be automatic data transmission or manual input, as described above. The processor performs several calculations, including a crab angle calculation 60, a steering radius calculation 62, and a steering angle calculation 64 for each of the plurality of wheels 12. Each calculation is discussed in more detail below. As also described hereinafter, the control method is automated and is generally implemented by a computer processor 58, such as a flight control computer or the like. As such, the control method is typically embodied in a computer program product, which directs the processor 58 to issue appropriate commands to the steering control mechanisms 42 in order to maneuver each wheel 12 to the desired steering angle.

It is desirable to crab an aircraft into the direction of an oncoming relative wind to obtain zero bank, minimum groundspeed, maximum control, and lift. If the wings of the aircraft are maintained level while ground track is maintained with the runway axis, the crab angle is typically calculated as follows:

$$C = \arctan\left[\frac{V_w \sin W}{V_a}\right]$$

where $V_w$ is the wind speed as measured by either a remote wind sensor or onboard wind sensor, $V_a$ is the aircraft airspeed, and W is the wind angle relative to the runway axis, where a direct headwind is zero degrees. Such an equation may, therefore, be used to compensate for crosswinds during landings or takeoffs, and embodied in the typical computer program product as described above.

Additional embodiments of the method, system, and computer program product for controlling a plurality of maneuverable wheels 12 on an aircraft may be further advanced with respect to compensation for crosswind takeoff. In this embodiment, the crab angle is calculated to align the aircraft 10 true heading such that the relative wind is aligned with the aircraft 10 at liftoff. The speed and direction of the wind can be determined by a remote wind sensor 56 at a ground station, which generally provides a reliable forecast of wind speed and direction at liftoff. Alternatively, the wind speed and direction at liftoff may be determined from onboard sensors 52 commonly found on aircraft 10, such as a pitot-tube sensors and static pressure sensors for determining wind direction and airspeed. Wind speed can be determined as follows:

$$V_w = \sqrt{V_a^2 + G_s^2 - (2V_a G_s \cos R_w)}$$

where $V_w$ is the wind speed, $V_a$ is the aircraft airspeed, $G_s$ is the aircraft 10 ground speed, and $R_w$ is the relative direction of the wind as seen by an onboard wind sensor 52, incorporating both the relative wind and an airspeed vector, such that a direct headwind is zero degrees. Airspeed is the aircraft speed with respect to freestream air. Ground speed is the aircraft speed with respect to ground. The wind angle may be calculated as follows:

$$W = 180° - \arccos\left[\frac{V_w^2 + G_s^2 - V_a^2}{2V_w G_s}\right]$$

where W is the wind angle relative to the runway axis such that a direct headwind is zero degrees. As discussed previously, crab angle is determined from the wind angle, wind speed, and airspeed. At takeoff, airspeed velocity is the takeoff airspeed, which is determined according to aircraft 10 design. Therefore, substituting takeoff airspeed, $T_a$, for aircraft airspeed, $V_a$, by the following:

$$C_t = \arctan\left[\frac{V_w \sin W}{T_a}\right]$$

where $C_t$ is the takeoff crab angle. As previously stated, it is desirable to maintain crab angle at zero for most of the takeoff procedure in order to attain maximum acceleration. Turning the aircraft 10 to a desired crab angle should occur just prior to liftoff and may be controlled by a predetermined setpoint to effect this turning. One such embodiment includes changing crab angle when aircraft airspeed is 80% of expected takeoff airspeed.

It is preferable to change crab angle about a predetermined point on the aircraft 10 for purposes of minimizing the adverse effects on aircraft handling while crabbing at a high velocity. Therefore, a point is chosen by the aircraft designer, about which to rotate the aircraft 10 while changing crab angle. This requires both crab angle control and steering radius control during the maneuver in order to maintain a straight path along the runway. At the point of rotation, the steering angle would be adjusted to align a wheel at that point with the runway axis (since the steering radius is zero at that point, however, there does not need to be an actual wheel at that point). The steering angles of wheels 12 about that point continuously maneuver to rotate the aircraft 10 to the desired crab angle. For purposes of illustration, the reference point is chosen as the point about which to maneuver the aircraft. Crab angle of the aircraft changes proportionally and is expressed as follows:

$$C(t) = \dot{C}T$$

where, $C(t)$ is the crab angle with respect to time, $\dot{C}$, is the desired rate of angular change of the crab angle, and $T$ is the time required to complete the maneuver. As such, steering radius may be determined as follows:

$$R = \left\{\tan\left[\frac{\arcsin(\tan \dot{C})}{G_s}\right]\right\}^{-1}$$

where $G_s$ is the expected ground speed at takeoff. Ground speed at takeoff is calculated based on the expected airspeed at takeoff, $T_a$, which is known. Ground speed at takeoff is as follows:

$$G_t = \left\{T_a \cos\left[\sin\left(\frac{\sin W}{T_a}\right)\right]\right\} - \{V_w \cos W\}$$

As steering radius and crab angle have been determined the steering angle for each of the plurality of maneuverable wheels 12 is calculated as follows:

$$S = \arctan\left[\frac{Y - R\sin C}{X - R\cos C}\right]$$

As will be recognized by those skilled in the art, wind gusts may disadvantageously affect the wind measurements taken by the onboard sensors 52. Therefore, one embodiment of the method and system for controlling a plurality of maneuverable wheels 12 during takeoff includes continuously reading wind measurements from the onboard sensors 52 during the taxi and takeoff sequence. As such, the wind measurements are integrated over time in order to factor out wind gusts and more accurately estimate expected wind speed and wind direction at takeoff. Crab angle is then recalculated and adjusted corresponding to the wind calculation.

An embodiment, a method, system, and computer program product for controlling a plurality of maneuverable wheels 12 on an aircraft 10 may be further advanced with respect to compensating for crosswind landing. Generally, it is desirable to land an aircraft into the wind, however, wind direction is often not aligned with the runway axis. The method, system, and computer program product for controlling a plurality of maneuverable wheels 12 advantageously allow the aircraft 10 to crab on landing by automatically determining a desired crab angle to land into the direction of the relative wind. This may be accomplished with wind speed and direction data in accordance with the above crab angle calculation, or alternatively in accordance with navigation data as follows.

The processor 58 generally receives true heading data and position data from a navigation system 54, such as Global Positioning System (GPS) or an inertial navigation system. The position data is used to calculate the aircraft's ground track and ground speed. With respect to the system for controlling a plurality of wheels, ground track and ground speed may be calculated by the processor 58 or alternatively by the navigation system 54 itself, as is often provided on many commercially available aircraft navigation systems described above. Ground track differs from true heading as a result of drift from a cross wind effect on the aircraft 10. The difference between the true heading and the ground track is generally called the drift angle and requires an opposed angle, the drift correction angle, for correction in flight to maintain a desired ground track. Drift correction angle calculations are often completed by flight control computers.

A similar calculation may be made for determining the ground track and true heading during a landing sequence. The crab angle is the correction that will be required such that the plurality of wheels 12 maintain the aircraft ground track upon landing. During a landing sequence, the ground track will necessarily correspond to the runway axis. The desired crab angle may then be calculated in order to position the longitudinal axis of the aircraft 10 into the wind direction while maintaining ground track upon landing. The difference between the ground track and the true heading determines the required crab angle to maintain the wheels 12 aligned with the runway axis. Therefore, the steering angle is determined such that each of the plurality of maneuverable wheels 12 aligns with the runway axis and maintains the ground track while continuing to keep the aircraft true heading directed into the oncoming wind. As such, the radical steering maneuvers commonly used to compensate for crosswind landings are not required thereby reducing pilot workload.

As indicated above, the method of controlling the plurality of maneuverable wheels 12 on a vehicle may be embodied by a computer program product that directs the operation of a flight control computer or the like to issue the commands to the plurality of steering mechanisms in order to affect the desired changes. In this regard, the computer program product includes a computer-readable storage medium, such as a non-volatile storage medium, and computer-readable program code portions, such as a series of computer instructions, embodied in the computer-readable storage medium. Typically, the computer program is stored by a memory device and executed by an associated processing unit, such as the flight control computer or the like.

In this regard, FIGS. 2 and 6 are block diagram, flowchart and control flow illustrations of methods and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for controlling a plurality of maneuverable wheels on an aircraft, comprising:
    a navigation system capable of providing continuous position data of the aircraft, wherein the navigation system provides a true heading;
    a processor responsive to said navigation system and wherein the processor is adapted to determine a ground track of the aircraft based on the continuous position data, and adapted to determine a crab angle relative to a true heading of the aircraft based on the continuous position data such that the crab angle aligns a longitudinal axis of the aircraft with respect to a relative wind direction, and wherein the crab angle is defined by a difference between the true heading and the ground track of the aircraft, said processor further adapted to determine a plurality of steering angles, each steering angle corresponding to a maneuverable wheel, based on the determined crab angle; and
    a plurality of steering mechanisms responsive to the controller for mechanically turning each of the plurality of wheels to its respective steering angle.

2. The system according to claim 1, further comprising a remotely located wind sensor for determining a speed of wind and a direction of wind, and wherein the navigation system provides an airspeed and the processor is responsive to the wind sensor and adapted to determine the crab angle based on the wind speed, the wind direction, and the aircraft airspeed.

3. The system according to claim 2, wherein the processor is further adapted to determine a crab angle based on an expected airspeed at takeoff.

4. The system according to claim 2, wherein the processor is further adapted to determine a crab angle based on an expected airspeed at landing.

5. The system according to claim 1, further comprising a sensor onboard the aircraft for determining an airspeed and a relative wind direction, and wherein the processor is responsive to the wind sensor and determines the crab angle based on the airspeed and the relative wind direction.

6. The system according to claim 5, wherein the processor is further adapted to determine the crab angle based on an expected aircraft airspeed at takeoff.

7. The system according to claim 5, wherein the processor is further adapted to determine the crab angle based on an expected aircraft airspeed at landing.

8. The system according to claim 1, wherein said processor calculates the steering angles based on a ground speed such that the aircraft pivots about a single point with respect to the aircraft, the ground speed being determined by the processor based on the continuous position data.

9. A method of controlling a plurality of maneuverable wheels on an aircraft, comprising:
    determining a true heading of the aircraft;
    determining a ground track of the aircraft;
    calculating a crab angle of the aircraft, wherein the crab angle corresponds to a difference between the ground track and the true heading;
    calculating a plurality of steering angles, each steering angle corresponding to a maneuverable wheel, based on the calculated crab angle; and
    steering each of the plurality of wheels to its respective steering angle.

10. The method according to claim 9, wherein the steering of each of the plurality of wheels is executed prior to a landing.

11. A method of controlling a plurality of maneuverable wheels on an aircraft comprising:
    determining an aircraft airspeed;
    determining a wind speed and a wind direction;
    calculating a crab angle relative to a longitudinal axis of the vehicle based on the aircraft airspeed, the wind speed and the wind direction such that the crab angle aligns the longitudinal axis of the aircraft with respect to a relative wind direction;
    calculating a plurality of steering angles, each steering angle corresponding to a maneuverable wheel, based on the calculated crab angle; and
    steering each of the plurality of wheels to its respective steering angle.

12. The method according to claim 11, wherein the aircraft airspeed is the expected aircraft airspeed at landing.

13. The method according to claim 11, wherein said steering each of the plurality of wheels is executed at a predetermined time prior to a takeoff.

14. The method according to claim 13, wherein the aircraft airspeed is the expected aircraft airspeed at takeoff.

15. The method according to claim 13, wherein each steering angle is calculated such that the aircraft steers to the crab angle by pivoting about a pivot point relative to the aircraft.

16. A computer program product for controlling a plurality of maneuverable wheels on an aircraft during a landing, the computer program product comprising a computer readable storage medium having computer-readable program code embodied in said medium, the computer-readable program code comprising:

a first executable portion adapted to determine a crab angle of the aircraft, wherein the first executable portion determines the crab angle based on a difference between a true heading of the aircraft and a ground track of the aircraft; and a second executable portion adapted to determine a plurality of steering angles, each steering angle corresponding to a maneuverable wheel, based on the determined crab angle.

17. A computer program product for controlling a plurality of maneuverable wheels on an aircraft during a takeoff, the computer program product comprising a computer readable storage medium having computer-readable program code embodied in said medium, the computer-readable program code comprising:

a first executable portion adapted to determine a crab angle of the aircraft relative to a true heading of the aircraft, wherein the first executable portion determines the crab angle based on an expected aircraft airspeed, a wind speed, and a wind direction, such that the resulting crab angle aligns a longitudinal axis of the aircraft with respect to a relative wind direction; and a second executable portion adapted to determine a plurality of steering angles, each steering angle corresponding to a maneuverable wheel, based on the determined crab angle.

18. A computer program product according to claim 17, wherein the expected aircraft airspeed is the expected aircraft airspeed at takeoff.

19. A computer program product according to claim 17, wherein the expected aircraft airspeed is the expected aircraft airspeed at landing.

20. A computer program product according to claim 17, wherein the first executable portion is adapted to determine the crab angle based on a remotely sensed wind speed, and a remotely sensed wind direction.

21. A computer program product according to claim 17, wherein the second executable portion determines the steering angle of each wheel to facilitate steering to the crab angle by pivoting the aircraft about a single point.

22. A system for controlling a plurality of maneuverable wheels on a vehicle, comprising:

a steering control interface for selecting a steering radius of the vehicle, wherein the radius is measured from a reference point relative to the vehicle;

a crab control interface for selecting a crab angle of the vehicle, wherein the crab angle is measured relative to a true heading of the vehicle;

a processor responsive to the steering control interface and the crab control interface and adapted to determine a plurality of steering angles, each steering angle corresponding to a maneuverable wheel, based on the steering radius and the crab angle; and a plurality of steering mechanisms responsive to the processor for mechanically turning each respective wheel corresponding to its respective steering angle.

23. The system according to claim 22, wherein the processor determines the plurality of steering angles such that each wheel rotates concentrically about the same point relative to the vehicle.

24. The system according to claim 22, further comprising a braking control interface, wherein the processor is responsive to the braking control interface and determines the steering angles such that at least two wheels rotate concentrically about dissimilar points relative to the vehicle.

25. The system according to claim 22, wherein the steering control interface comprises a first rotating hand wheel and the crab control interface comprises a second rotating hand wheel.

26. A method of controlling a plurality of maneuverable wheels on a vehicle comprising:

providing a user defined steering radius of the vehicle, wherein the steering radius is measured from a reference point relative to the vehicle;

providing a user defined crab angle of the vehicle relative to a true heading of the vehicle, based on the steering point;

calculating a plurality of steering, angles, each steering angle corresponding to a maneuverable wheel, based on the steering radius and the determined crab angle of the vehicle; and steering each respective wheel to its respective steering angle.

27. The method according to claim 26, wherein each steering angle is calculated such that each wheel rotates concentrically about the same point with respect to the reference point.

28. A method of controlling a plurality of maneuverable wheels on a vehicle, comprising:

providing a user defined steering point relative to the vehicle;

determining a steering radius of the vehicle based upon the steering point, wherein the steering radius is measured from a reference point relative to the vehicle;

determining a crab angle of the vehicle relative to a true heading of the vehicle and based on the steering point;

calculating a plurality of steering angles, each steering angle corresponding to a maneuverable wheel, based on the steering radius and the determined crab angle of the vehicle; and steering each respective wheel to its respective steering angle.

29. The method according to claim 28, wherein each steering angle is calculated such that each wheel rotates concentrically about the same point with respect to the reference point.

30. A computer program product for controlling a plurality of maneuverable wheels on a vehicle, the computer program product comprising a computer-readable storage medium having computer-readable program code embodied in said medium, the computer-readable program code comprising:

a first executable portion adapted to determine a steering radius and a crab angle of the vehicle based on at least one user input defining a steering point relative to the vehicle about which to steer the vehicle; wherein the steering radius is measured from a reference point relative to the vehicle to the steering point, and wherein the crab angle is relative to a true heading of the vehicle; and a second executable portion adapted to determine a plurality of steering angles, each steering angle corresponding to a maneuverable wheel, based on the crab angle and the steering radius.

31. The computer program product according to claim 30, wherein a first and second user input define the steering point, the first user input comprises a crab angle selection and the second user input comprises a steering radius selection, respectively.

32. The computer program product according to claim 30, wherein the first executable portion determines the crab angle and the steering radius based on a first user defined input comprising a coordinate point selection relative to the reference point.

33. The computer program product according to claim 30, wherein said second executable portion determines each steering angle such that each wheel rotates concentrically about the same point with respect to the reference point.

* * * * *